United States Patent
Depoutovitch et al.

(10) Patent No.: US 11,106,541 B2
(45) Date of Patent: Aug. 31, 2021

(54) SYSTEM AND METHOD FOR REPLICATING DATA IN DISTRIBUTED DATABASE SYSTEMS

(71) Applicant: HUAWEI TECHNOLOGIES CO., LTD., Guangdong (CN)

(72) Inventors: Alexandre Depoutovitch, Toronto (CA); Per-Ake Larson, Etobicoke (CA); Chong Chen, Richmond Hill (CA)

(73) Assignee: HUAWEI TECHNOLOGIES CO., LTD, Guangdong (CN)

( * ) Notice: Subject to any disclaimer, the term of this patent is extended or adjusted under 35 U.S.C. 154(b) by 179 days.

(21) Appl. No.: 16/355,521

(22) Filed: Mar. 15, 2019

(65) Prior Publication Data

US 2020/0293407 A1 Sep. 17, 2020

(51) Int. Cl.
*G06F 11/00* (2006.01)
*G06F 11/14* (2006.01)
*G06F 16/27* (2019.01)

(52) U.S. Cl.
CPC ...... *G06F 11/1451* (2013.01); *G06F 11/1469* (2013.01); *G06F 16/273* (2019.01); *G06F 2201/80* (2013.01); *G06F 2201/82* (2013.01); *G06F 2201/84* (2013.01)

(58) Field of Classification Search
CPC ............ G06F 11/1451; G06F 11/1469; G06F 11/0709; G06F 11/0727; G06F 11/1448; G06F 11/1467; G06F 11/1471; G06F 16/273; G06F 2201/80; G06F 2201/82; G06F 2201/84
See application file for complete search history.

(56) References Cited

U.S. PATENT DOCUMENTS

| | | | |
|---|---|---|---|
| 9,507,843 B1* | 11/2016 | Madhavarapu | G06F 3/0619 |
| 2012/0215740 A1 | 8/2012 | Vaillant et al. | |
| 2014/0289370 A1 | 9/2014 | Hamada | |
| 2014/0324785 A1 | 10/2014 | Gupta et al. | |
| 2017/0132091 A1* | 5/2017 | Leshinsky | G06F 11/1471 |
| 2018/0246945 A1* | 8/2018 | Lee | G06F 11/3433 |

FOREIGN PATENT DOCUMENTS

CN 108108476 A 6/2018

OTHER PUBLICATIONS

International Search Report and Written Opinion for PCT/CN2020/078943, filed Mar. 12, 2020, dated Jun. 10, 2020; 10 pp.

* cited by examiner

*Primary Examiner* — Joseph D Manoskey
(74) *Attorney, Agent, or Firm* — Trop, Pruner & Hu, P.C.

(57) ABSTRACT

A method includes receiving an indication of a change to a page of a database and adding a new log record corresponding to the page to a common log comprising log records, the new log record describing the change made to the page and assigned a distinct version number. The method further includes synchronously writing the new log record to each log store replica in a set of log store replicas, and asynchronously writing the new log record to all page store replicas for the page to update the page that is stored on each of the page store replicas, where each store replica for the page serves reads for the page. In response to receiving, from a predetermined number of the page store replicas, an acknowledgement of the writing of the log record, discarding the new log record from the common log.

20 Claims, 6 Drawing Sheets

SYSTEM AND METHOD FOR REPLICATING DATA IN DISTRIBUTED DATABASE SYSTEMS

BACKGROUND

A database system allows a large volume of data to be stored, managed, updated, and analyzed. In a distributed database system, the data may be stored on and distributed among a cluster of storage nodes, where each storage node includes one or several non-volatile storage devices. The data of the database system may be organized into units called pages, all changes to pages of the database system may be enumerated with the number assigned to the latest change to a page being called the page version. A particular read request to read a page of the database system may specify a particular page version.

Because one or more of the storage nodes of the cluster may occasionally fail or be temporarily unavailable, multiple copies of the data may be stored on multiple storage nodes. Therefore, should a storage node that stores a page temporarily or permanently fail, the database system may use one or more of the other storage nodes to recover the missing data. However, storing multiple copies of the data on multiple storage nodes increases the cost of the database system due to the requirement to have a large number of additional storage devices.

SUMMARY

One way to manage the storage of data in a distributed database system is to apply the same replication policy to both pages and log records (e.g., records that describe changes to a page). With this approach, pages and log records are stored at the same dedicated set of N storage nodes. More specifically, when a first predetermined number W (where W less or equal to N) of the N dedicated storage nodes acknowledge a particular write request, the write request is considered to be served. For purposes of reading a page, read requests may be sent to several of the storage nodes, and the read request is considered to be served when a second predetermined number R (wherein R+W>N) of the storage nodes return identical results. Increasing the number N of storage nodes increases the database system's persistency (i.e., decreases the probability of an irreversible data loss) and read availability for read requests (i.e., decreases the probability of temporarily being unable to serve a read request), as more storage nodes are available for recovery operations and are available to serve the read requests. However, increasing the number of storage nodes may have adverse consequences. For example, increasing the number of storage nodes may increase costs, as more storage is used; and additional effort may be consumed to ensure replica consistency during data modification, thereby increasing latency and consuming additional computing resources, such a processing resources, network resources, and memory resources. Moreover, the database system's availability to respond to write requests may decrease with an increasing number of page store replicas.

In accordance with example implementations that are described herein, a distributed database system uses different replication policies for page stores and log stores. A replication policy for a page store is a set of rules specifying, how many page store replicas and are required by the distributed database system in total, which page store replicas to send log records to, and how many acknowledgements the distributed database system should receive before deciding that a log record is persistent. A replication policy for a log store is a set of rules specifying, how many log store replicas and are required by the distributed database system in total, which log store replicas to send log records to, and how many acknowledgements the distributed database system should receive before deciding that a log record is persistent. As described herein, the use of a replication policy, in accordance with example implementations, may enhance performance of the distributed database system. For example, the use of a replication policy may provide relatively high read availabilities for read and write requests, while using a relatively small number of page store replicas. Moreover, as described herein, the replication policy may allow for a robust way to identify and recover from long term and short term cascading page store replica failures.

According to an aspect of the present disclosure, there is provided a method that includes, receiving an indication of a change to a page of a database and adding a new log record corresponding to the page to a common log comprising log records, the new log record describing the change made to the page and assigned a distinct version number. The method also includes synchronously writing the new log record to each log store replica in a set of log store replicas, and asynchronously writing the new log record to all page store replicas for the page to update the page that is stored on each of the page store replicas, wherein the page store replica for the page serve reads for the page. In response to receiving, from a predetermined number of the page store replicas, an acknowledgement of the writing of the log record, discarding the new log record from the common log.

According to another aspect of the present disclosure, there is provided a non-transitory machine readable storage medium to store instructions that, when executed by a machine, cause the machine to: receive an indication of a change to a page of a database; add a new log record corresponding to the page to a common log comprising log records, the new log record describing the change made to the page and assigned a distinct version number, synchronously write the new log record to each log store replica in a set of log store replicas; and asynchronously write the new log record to all page store replicas for the page to update the page that is stored on each of the page store replicas, wherein the page store replica for the page serve reads for the page; and in response to receiving, from a predetermined number of the page store replicas, an acknowledgement of the writing of the log record, discard the new log record from the common log.

According to another aspect of the present disclosure, there is provided an apparatus that includes a processor and a memory. The memory stores instructions that, when executed by the processor, cause the processor to: receive an indication of a change to a page of a database; add a new log record corresponding to the page to a common log comprising log records, the new log record describing the change made to the page and assigned a distinct version number; synchronously write the new log record to each log store replica in a set of log store replicas; and asynchronously write the new log record to all page store replicas for the page to update the page that is stored on each of the page store replicas, wherein the page store replica for the page serve reads for the page; and in response to receiving, from a predetermined number of the page store replicas, an acknowledgement of the writing of the log record, discard the new log record from the common log.

Optionally, in any of the preceding aspects, in another implementation, the log store replicas and the page store replicas are at different storage nodes and the storage nodes are at different availability zones.

Optionally, in any of the preceding aspects, in another implementation, the number of log store replicas in the set of log store replicas is the same as the number of page store replicas t.

Optionally, in any of the preceding aspects, in another implementation, the number of log store replicas in the set of log store replicas is the different than the number of page store replicas.

Optionally, in any of the preceding aspects, in another implementation the set of log store replicas comprises at least three log store replicas at different availability zones.

Optionally, in any of the preceding aspects, in another implementation, the availability zones are associated with different geographical locations.

Optionally, in any of the preceding aspects, in another implementation, asynchronously writing to the page store replicas to effect the change to the page includes sending an instruction to the first page store replica to allow a peer-to-peer gossip protocol to be used between a first node and a second node of the second subset to update a page store replica stored on the first node to effect the change to the page store replica stored on the first node.

Optionally, in any of the preceding aspects, another implementation comprises reading the page, wherein the reading comprises selecting a page store replica of the page store replicas and reading the page from the selected page store replica.

Optionally, in any of the preceding aspects, in another implementation, selecting the page store replicas comprises determining a requested logical sequence number associated with the reading of the page and selecting the page store replica based on a logical sequence number acknowledged by the selected page store replica.

Optionally, in any of the preceding aspects, in another implementation, a failure of a page store replica is detected and a recover operation is performed in response to the detected failure. Performing the recovery operation includes generate a new page store replica to replace the failed page store replica, and enabling the new page store replica for the page and at least one other page store replicas to use a peer-to-peer replication of data between the replacement node and at least one other node of the second subset of nodes.

Optionally, in any of the preceding aspects, in another implementation, a cascading failure of multiple page store replicas of the page store replicas may be detected and a recovery operation may be performed in response to the detected cascading failure. Performing the recovery operation may include identifying a set of log records corresponding to the page subject to the cascading failure; reading the set of identified log records from at least one node of the first subset of nodes; and writing to the multiple page store replicas based on the read set of identified log records.

Optionally, in any of the preceding aspects, in another implementation, detecting the cascading failure may include determining a given page store replica acknowledged the writing of a given log record corresponding to the given page; and determining none of the other page store replicas for the given page are currently acknowledge writing of the log record.

Optionally, in any of the preceding aspects, another implementation comprises detecting a failure of a log store replica in the set of log store replicas; selecting a new set of log store replicas; and synchronously writing synchronously writing the new log record to each log store replica in a set of log store replicas.

DETAILED DESCRIPTION

In accordance with example implementations that are described herein, a distributed database system stores data of a database at storage nodes in a cluster of storage nodes. In this context, a "storage node" refers to an independent unit of storage, and may include one or multiple persistent or non-volatile storage devices, such as magnetic media drive devices, solid state drive devices, non-volatile memory storage devices, and so forth. As more specific examples, a particular storage node may be an independent computer system containing one or multiple storage devices, a storage area network (SAN), and so forth. The data may be stored in the storage device(s) of the storage node using block-based storage or file-based storage. The data of the database is stored on the one or multiple persistent or non-volatile storage devices of a storage node.

In general, the distributed database system maintains a database and stores units of data called database pages (or "pages"). As an example, a "page" may be data that corresponds to data values associated with a database table or portion thereof. A page is assigned to a page store in the distributed database system. A storage node that stores the page (and other pages of the database) is referred to herein as a "page store", and due to the replication of the page store, multiple copies of the page store, called "page store replicas" are actually included in the cluster. More specifically, as further described herein, each storage node in the cluster of storage nodes contains a page store replica to which one or more pages of the database are assigned to. A page store replica may be used to reconstruct the page assigned to the page store replica and may serve reads of the page.

The distributed database system maintains and stores a common log that includes log records for all changes to the database. In this context, the "common log" refers to a sequential list of log records, and each log record corresponds to a particular page of the database and describes an intended modification or change to a particular page of the database. The distributed database system manages and writes log records of the common log corresponding to a particular page to all page store replicas for the page (i.e., all page store replicas to which the particular page is assigned to) to update the particular page so that read requests for the particular page can be served. The distributed database system also writes logs record of the common log to log store replicas to maintain persistency. As further described herein, the distributed database system may maintain the common log by truncating, or removing, log records from the common log that correspond to pages whose modifications or changes the database management system deems to have been committed to the page store replicas to inhibit the common log, which is an append only log, from growing indefinitely. In the present disclosure, a storage node that stores log records of the common log that are written by the database management system is referred to as a "log store". Due to replication of the log store, multiple copies of the log store, called "page store replicas" are actually included in the cluster of storage nodes. A given storage node in the cluster of storage nodes may contain a log store replica, a page store replica, or both a log store replica and a page store replica.

As described herein, the DBMS of the distributed database system may read pages from page store replicas and write log records of the common log to log store replicas and page store replicas. In this context, reading a page from a page store replica for the page (i.e. the page store replica that the page is assigned to) refers to the DBMS of the distributed database system communicating a read request (or "read," as otherwise referred to herein) to a page store replica, and the page store replica providing the page in response to the read request to serve the read request. The read may include an identifier of the page and a version of the page that is to be read from the page store replica. Writing log records of the common log to log store replica refers to the DBMS of the distributed database system communicating as write request (or "write," as otherwise referred to herein) to log store replicas, for the purpose of causing the log store replicas located at different storage nodes to store the log records of the common log. Each log record of the common log describes a change to a page (e.g. changes to one or multiple data values in the page). The read or write request is "served," if the request is fulfilled.

There are many potential ways to manage how a page is written to and read from a page store replica in a distributed database system; and in particular, there are many potential ways to manage how changes to pages of a database (e.g., log records corresponding to a page) propagate to page store replicas that the pages are assigned to and to log store replicas, and manage how the page store replicas serve read requests. One way is to use a storage policy which specifies that the same N storage nodes are to contain both page store replicas (one per storage node) and log store replicas (one per storage node). With this approach, a replication policy may be used which specifies that log records corresponding to a given page are written to the N page store, and a given write request to write a log record describing a change to a given page is deemed completed when W (where W<N) of the dedicated page store replicas for the given page acknowledge the write request. The replication policy may also specify that for a read request (i.e. a request to read a given page), the read request may go to several of the N page store replicas for the given page, and the read request may be deemed completed when R of the page store replicas for the given page returns the given page, where R+W>N. Regardless of the selection of N, W and R, there may be a tradeoff between the higher availability for read requests gained from a larger number of page store replicas for the given page versus the adverse effects (e.g., costs, latencies and poorer availability for write requests) due to a larger number of page store replicas for the given page.

In accordance with example implementations, for purposes of increasing the availability for write requests and limiting the number of page store replicas, a storage policy is used which specifies that log store replicas may be at different storage nodes than the page store replicas, and different replication policies are used for writing log records of a common log to the page store replicas and to the log store replicas. More specifically, in accordance with some implementations, the distributed database system includes a set of storage nodes of a large cluster of storage nodes. Each storage node in the set of storage nodes contains a page store replica for a page (i.e., a page store replica to which a particular page is assigned to). The distributed database system includes log store replicas, however, the log store replicas, are not constrained to be at this set of storage nodes. Accordingly, when a change is made to the page of the database, the DBMS of the distributed database system adds a new log record describing the change made to the page of the database to a common log that includes existing log records describing changes made to pages of the database. The distributed database system writes the log records of the common log, including the new log record to a set of log store replicas for storage thereon. Moreover, to effect the change, the distributed database system synchronous writes the new log record to the log store replicas and asynchronously writes the new log record to all of the page store replicas.

More specifically, in accordance with example implementations, the distributed database system proceeds with four stages (further described herein) when a change is made to a particular page of the database due to user activity at a client device: a first stage to sequence, or version, a new log record corresponding to the page and to add the new log record to the common log (the new log record describes the change to the particular page of the database); a second stage to write the new log record (i.e., write the new log record of the common log describing the change to the page) to log store replicas; a third stage to write log record to dedicated page store replicas (e.g., page store replicas that the particular page is always assigned to) to store the new log record at the dedicated page store replicas so that the dedicated page store replicas reflect the change to the particular page; and a fourth stage to manage the common log to remove the new log record from common log when at least one of the dedicated page store replicas acknowledges the write request, which indicates that the new log record has been deemed to be committed to the dedicated page store replicas. It is noted that these four stages may be performed sequentially, or stages two and three may be performed in parallel. It is also noted that all four stages are repeated for change made to a particular page of the database.

In the first stage of the four stage process, the distributed database system receives an indication of a change to a particular page of the database and generates a new log record corresponding to the page. The database versions the new log record corresponding the change to a particular page by assigning a logical sequence number (LSN) to a new log record. The new log record includes an identifier of the page that has been changed and the LSN assigned to the new log record. The new log record is then added to a common log. The new log record describes the change to be made to the page (e.g., a particular byte or particular set of bytes to be changed). The common log therefore contains sequenced, or versioned, log records for all changes to pages of the database.

In the second stage, the distributed database system sends write request to log store replicas and to dedicated page store replicas for the page (e.g., page store replicas to which the particular page is assigned to) to write the new log record to the log store replicas and the page store replicas. More specifically, in accordance with example implementations, the distributed database system synchronously writes the new log record to any subset of N log store replicas of the database system. In this context, a "synchronous write" refers to the distributed database system considering the write request to be successful (and therefore, acknowledging the synchronous writes to a client device associated with the user) upon the condition that all of N log store replicas acknowledge the write request. If any storage node that contains one of the log store replica of the subset of N log store replicas fails, the DBMS selects another subset of N log store replicas to synchronously write the new log record.

In accordance with example implementations, writing to "any subset of N log store replicas" refers to distributed database system selecting any N number of log store replicas for the writing of the new log record, independently from the N dedicated page store replicas for the page. For example, assume that N=3 and three changes are to be made to a particular page of the database, resulting in log records 1, 2 and 3, each of which describes one of three changes to the particular page. As an example, the distributed database system may send write requests to the log store replicas at storage nodes A, B and C to write log record number 1 to log store replicas at storage nodes A, B and C to effect the first change to the particular page; send writes requests to log store replicas at storage nodes A, D and F to write the log record 2 to the log store replicas at storage nodes A, D and F to effect the second change to the particular page; and send write requests to log store replicas at storage nodes B, G, and H to write the log record 3 to log store replicas at storage nodes B, G and H to effect the third change of the particular change. It is noted that for all three changes, the distributed database system may asynchronously write the log records 1, 2 and 3 to three dedicated page store replicas for the page that may be at the same three storage nodes (as described herein for stage three).

In accordance with example implementations, the database system includes N page store replicas for a given page, and the distributed database system writes log records corresponding to the given page to each of the N page store replicas for the page (i.e., all N page store replicas for the page) until one of the N page store replicas for the given page becomes unavailable. At this point, the distributed database system may perform a recovery operation as described below to recover the one page store replica for the given page that became on available or to create a new page store replica for the given page in the event the one page store replicas does not become available. The distributed database system also synchronously writes log records present in the common log corresponding to the given page to each log store replicas of a set of log store replicas, until one of the one of the N log store replicas becomes unavailable, and at this time, the distributed storage system may select a different set of N log store replicas (which may or may not contain any of the previously log store replicas of the set of log store replicas). Thus, the distributed database system can acknowledge changes to pages of a database to a client device even if none of the N page store replicas have acknowledge the writing of the log record corresponding to the pages (i.e., the log records describing the changes to the pages), as long as a predetermined number of the N log store replicas have acknowledged the writing of the log records corresponding to the pages. While the N page store replicas at are fixed locations (e.g. at fixed storages nodes in the cluster), the log record corresponding to the pages can be written to any available log store replica in the cluster of storage nodes.

In accordance with some implementations, the distributed database system may distribute N storage nodes across N availability zones (i.e., the distributed database system may impose the constraint that each log store replica is at a storage node that is associated with a different availability zone than the storage nodes that contain the other log store replicas). In this context, an "availability zone" is corresponds to a particular geographical location, so that if a particular storage node that is associated with one availability zone fails (due a power failure or natural disaster, for example), this failure may not be expected to affect the storage nodes that are associated with other availability zones. As a more specific example, in accordance with some implementations, the storage nodes that contain the log store replicas may be located in a different data centers, and the data centers may be located hundreds of miles apart.

In the third stage, the distributed database system sends out asynchronous write requests to N dedicated page store replicas for the page. In this context, the "asynchronous write requests" refer to the distributing database system sending out the write requests, and the distributed database system not waiting for an acknowledgment of the write requests from any of the N dedicated page store replicas for the page before acknowledging the writes to the client device from which the change to the particular page was received from. Instead, as further described herein, the distributed database system assumes that the page store replicas for the page will eventually be consistent due to a peer-to-peer gossip protocol (described further herein).

Thus, in accordance with example implementations, the distributed database system asynchronously writes log records of the common log corresponding to a particular page to any N log store replicas to store the log records and writes to a dedicated set of N storage nodes to make changes to the page store replicas stored on these dedicated storage nodes. Therefore, for the example set forth above for N=3, three storage nodes, such as storage nodes M, P and Z, may be dedicated to storing three page store replicas for a given page and serving reads to the page. When a changes occurs to the page, corresponding to data fragments 1, 2 and 3, the distributed database system asynchronously writes the data fragments 1, 2 and 3 to the same storage nodes M, P and Z (assuming no failures for this example), although each set of log records (corresponding to each data fragment) may be written to a different set of three storage nodes.

The fourth stage relates to managing the common log by removing a log record from the common log when the corresponding change to the page has been committed to the dedicated page store replicas for the page. In this manner, eventually, all N dedicated page store replicas for the page acknowledge the asynchronous write requests, and when this occurs, the database management system truncates the common log to remove the log record that corresponds to the page. Accordingly, the database management system discards the log records from log store replicas that correspond to the removed log record from the common log. In this context, "discarding the log records" refers to not returning storage space occupied by the log records to a list of free storage spaces for subsequent reuse.

In accordance with example implementations, to read a given page from the database, the DBMS may send a read request to read a page to any page store replica that the page is assigned to. The read request must be accompanied by an LSN and as such, requests a particular version of a page. As further described herein, a given page store replica that the page is assigned to may or may not be able to serve a read request, depending on whether the given page store replica contains the page corresponding to the requested version; and if the requested page is unavailable, the distributed database system may send a read request to read the page to another page store replica.

As noted above, read requests to read pages stored in the database of the distributed database system are accompanied by the LSN. If a particular page store replica to which the page is assigned to cannot serve the read request, then the particular read request may be tried on another page store replica.

In accordance with example implementations, the distributed database system repeats the four stage process describe above each time an indication of a change made to a particular page of the database is received from the client device. The change to the particular page may be due to user activity at the client device.

As described further herein, the above-described replication and storage policies allows efficient recovery of data for short term and long term page store replica failures, as well as a way to identify and recover from long and short term cascading page store replica failures.

Figure 1:
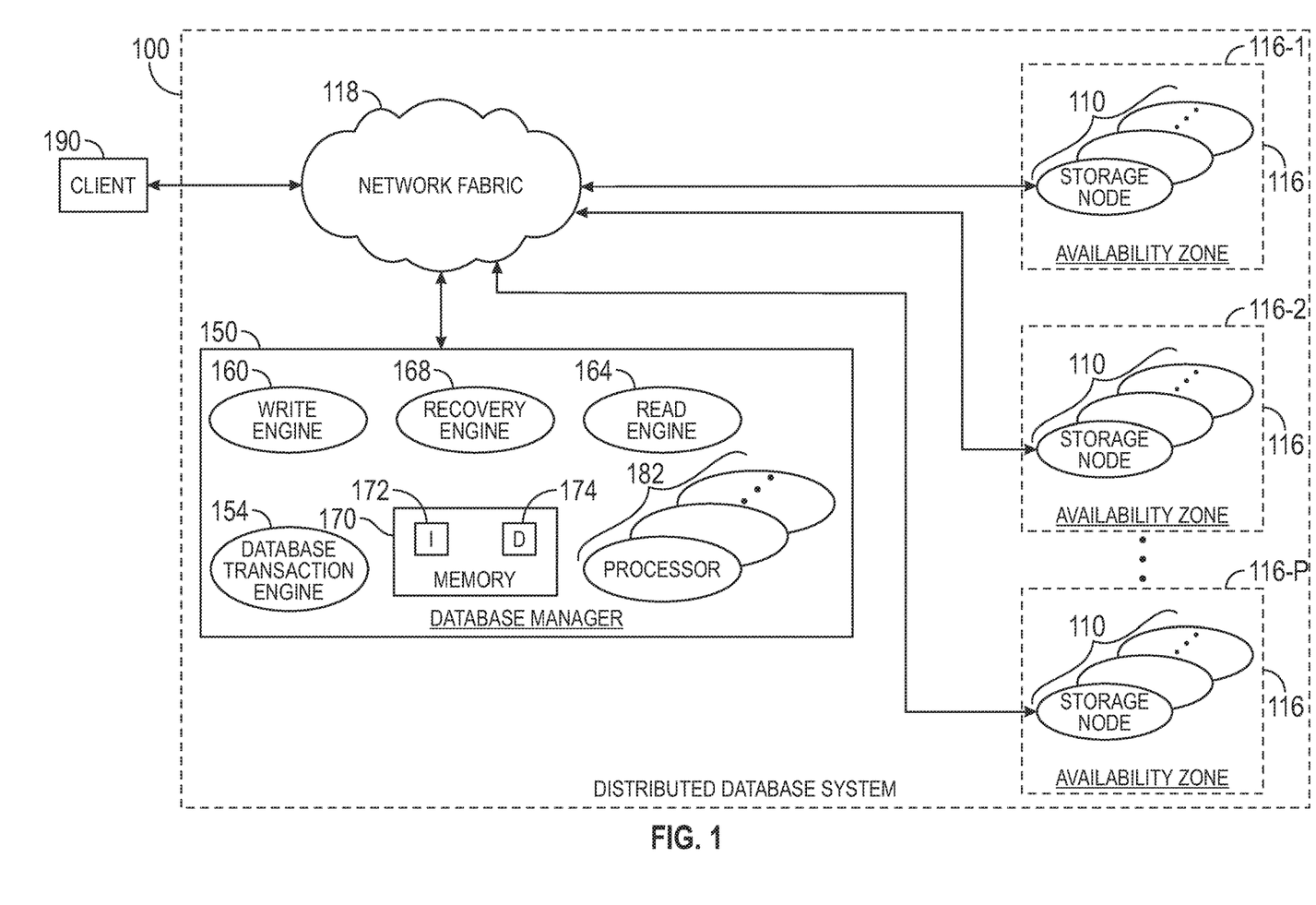
FIG. 1 is a schematic diagram of a distributed database system according to an example implementation.

Referring to a more specific example, FIG. 1 depicts a distributed database system 100 in accordance with example implementations. In general, the distributed database system 100 includes a cluster of storage nodes 110. Moreover, the cluster may be partitioned among availability zones 116 (P availability zones 116-1, 116-2 . . . , 116-P, being depicted as examples in FIG. 1). In this manner, in accordance with example implementations, each availability zone 116 may correspond to a different physical location, such that a failure at one availability zone 116 may not be expected to affect the remaining availability zones 116. In accordance with some implementations, each availability zone 116 may be associated with a particular data center, and, in accordance with example implementations, the data centers for the corresponding availability zones 116 may be located at different geographical locations (hundreds of miles apart, for example).

In accordance with some implementations, the database manager 150 represents one or multiple physical machines (computers, rack-mounted computers, and so forth), which contain machine executable instructions ("software") and actual hardware, such as a memory 170 and one or multiple processors 182.

In accordance with example implementations, the processors 182 may execute machine executable instructions ("software"), and as such, may include one or multiple central processing units (CPUs), one or multiple CPU processing cores, one or multiple microcontrollers, and so forth. Moreover, in accordance with further example implementations, the processor 182 may be a dedicated hardware circuit that does not execute machine executable instructions, such as a field programmable gate array (FPGA), an application specific integrated circuit (ASIC), and so forth.

The memory 170, in general, is a non-transitory storage medium, such as a storage medium that may include semiconductor storage devices, optical storage devices, magnetic storage devices, solid state storage devices, phase change memory devices, memristors, storage devices formed from one or more of these storage technologies, and so forth. Moreover, the memory 170 may be formed from a bank of memory devices, may be formed from multiple banks of memory devices, may be formed from memories that are connected by buses or other interconnects, and so forth.

In accordance with example implementations, the memory 170 may store machine executable instructions 172 (or "software"). The machine executable instructions 172 ("software") includes software for creating and managing a database (not shown). This software is generally referred to as a database management system (DBMS). The machine executable instructions of the DBMS when executed by one or multiple processors 182, cause the processor(s) 182 to create and manage a database and perform the method of the present invention described herein. The DBMS includes various module or engines, such as a database transaction engine 154, a write engine 160, a read engine 164, a recovery engine 168 and/or any combination of these modules or engines. The memory 170 may further store data 174, which may be data representing log records to be written to the log store replicas and page store replicas, data involved in writing the page store data (e.g., pages that are assigned to the page store replicas) to the storage nodes 110, data associated with reading data from the storage nodes 110, data associated with recovering data due to a failed page store replica, data representing the most recent LSN, and so forth. As depicted in FIG. 1, in accordance with example implementations, the database manager 150 and storage nodes 110 may communicate over network fabric 118.

In accordance with example implementations, the network fabric 118 may include any type of wired or wireless communication network, including cellular networks (e.g., Global System for Mobile Communications (GSM), 3G, Long Term Evolution (LTE), Worldwide Interoperability for Microwave Access (WiMAX), etc.), digital subscriber line (DSL) networks, cable networks (e.g., coaxial networks, fiber networks, etc.), telephony networks, local area networks (LANs), wide area networks (WANs), global network fabric (e.g., network fabric communicate Internet traffic) or any combination thereof.

Depending on the particular implementation, the distributed database system 100 may store structured, unstructured or semi-structured data pertaining to a relational database or a non-relational database. Regardless of its particular form, changes to data in the database may be communicated to the DBMS 172 running on the database manager 150 from a client 190 (a client connected via the network fabric 118, for example). In accordance with example implementations, the client 190 may be a processor-based system, such as (as examples) a desktop computer, a laptop computer, a tablet computer, a wearable computing device, a smartphone, and so forth. In general, a user interacting with the client 190 may cause a change to data in the database, such as a particular page of the database. This change to the page, in turn, affects a corresponding set of page store replicas for the page that are at the storage nodes 110.

In accordance with example implementations, the database transaction engine 154 may process database transaction requests communicated from the client 190 and in response to these requests, may cause corresponding changes to pages of the database. Accordingly, these changes affect corresponding page store replicas. Regardless of the source of the change, when a change to a page occurs, the write engine 160 may proceed with the above-described four stage process to write a new log record describing the change to the page to log store replicas and page store replicas the page is assigned to (i.e. page store replicas for the page). As also depicted in FIG. 1, the DBMS may use the read engine 164 to process read requests to read a page of the database from page store replicas for the page and, as further described herein, use the recovery engine 168 to recover data that is unavailable due to one or multiple page store replica failures for the page.

Figure 2:
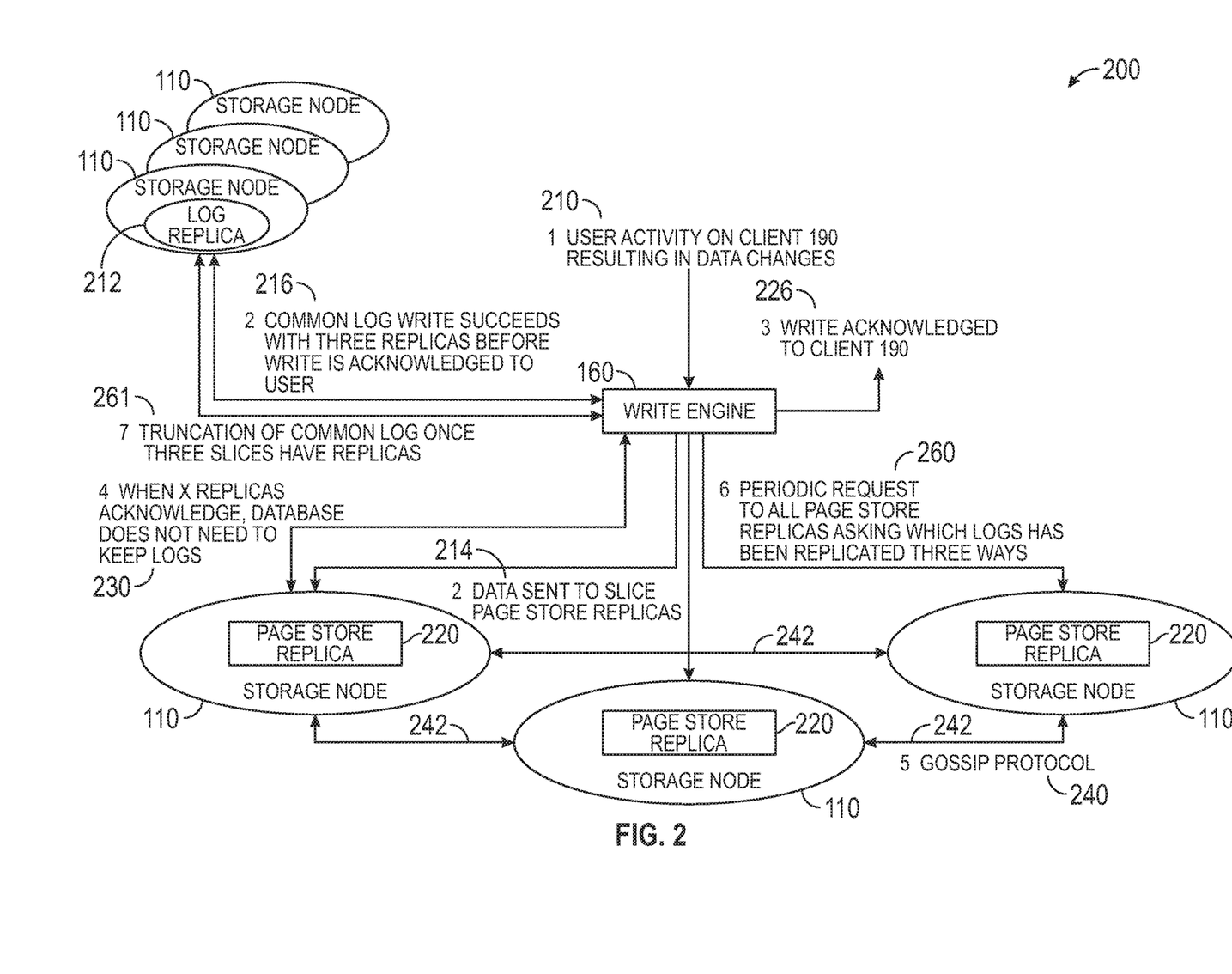
FIG. 2 is an illustration of stages performed by the distributed database system in response to a page being modified according to an example implementation.

Referring to FIG. 2 in conjunction with FIG. 1, in accordance with some implementations, the four stage process to update page store replicas 220 and write log records to log store replicas 212 when a change to a page occurs will now be described in detail. More specifically, in accordance with an example, the number of page store replicas for a particular page is three (i.e., N=3), and the page store replicas 220 for the particular page are at three different storage nodes 110 of the cluster. Moreover, the log store replicas 212 are at any three storage nodes 110 of the cluster.

As indicated at reference numeral 210 (FIG. 2), user activity at the client device 190 results in a change to a particular page of the database, thereby resulting in a new log record corresponding to the particular page. The new log record contains the corresponding data fragment representing the change to the particular page (one or multiple bytes, for example). The new log record is assigned an LSN as described in the first stage above. The log record is then added to a common log maintained by the DBMS. The common log includes log records which describe all changes to pages in the database. Correspondingly, this change affects the page store replicas 220 for the particular page.

As depicted at reference numeral 216, the write engine 160 performs synchronous writes to write the new log record corresponding to the page to any three log store replicas 212 at storage nodes 110. In this context, a "synchronous write" means that after the write engine 160 deems the log record of the common log to be successfully written to all three log store replicas 212, the write is acknowledged by all the three log store replicas 212 to the DBMS and the change to the page of the database is acknowledged to the client device 190.

As indicated at reference numeral 214, the new log record corresponding to the page (i.e., the new log record) describing the change to the page is asynchronously written, by the write engine 160, to the three page store replicas 220 for the page (i.e., three page stores to which the page is assigned to). In this context, "asynchronously written" refers to the DBMS not receiving, for a particular write request, acknowledgement to indicate that the particular write has completed. Therefore, after the writing the new log record to the page store replicas 220 for the page (but possibly before all of the page store replicas 220 for the page acknowledge the writes), the write is acknowledged to the client device 190, as depicted at reference numeral 226.

In accordance with example implementations, each page store replica 220 receives the new log record corresponding to a particular page from the common log and updates the given particular page. Each page store replica 220 is aware of any missing versions of the particular page (due to the sequencing of the LSNs) and is aware of the maximum LSN for which all LSNs below the maximum LSN have been processed by the page store replica 220 for the particular page. As described further herein, this knowledge allows the page store replica 220 for the particular page to report the maximum LSN for the particular page to the DBMS running on the database manager 150, and the DBMS uses this knowledge for purposes of detecting and responding to page store replica failures, as further described herein. Moreover, the log store replicas 212 may provide log records describing changes made to pages of the database to the page store replicas 220. The DBMS may instruct a page store replicas 220 for the particular page to use a peer-to-peer gossip communication protocol to provide a data fragment to another page store replica 220 for the particular page (which is missing the data fragment).

In accordance with example implementations, when a certain number (called "X," and which may be for this example 1, 2 or 3) of the page store replicas 220 acknowledge the asynchronous writes, then, in accordance with example implementations, the DBMS does not retain the new log record in memory 170 and does not try to resend them, but rather relies on a gossip protocol to ensure that eventually all page store replicas receive all log records. As depicted at reference numeral 261, the DBMS truncates the common log to remove the new log record only when all N page store replicas acknowledge the write of the new log record.

Due to the asynchronous writing of the log record describing the change to a particular page to the page store replicas 220 that the particular page is assigned to, the write mechanism itself is not relied on to ensure that the log records are stored in all of the page store replicas 220 that the particular page is assigned to. Instead, in accordance with example implementations, a "gossip protocol" is used to ensure that the log records are stored in all of the page store replicas 220 that the particular page is assigned to. In this context, the "gossip protocol" refers to a peer-to-peer communication between the storage nodes 110 containing the page store replicas 220 so that the page store replicas 220 supply any missing log records to each other. For example, page store replica Q may be missing the log record assigned LSN=7 but on inquiring to another storage node 110, containing another page store replica T, page store replica Q may learn that page store replica T contains the missing log record. Accordingly, the storage node 110 containing the page store replica T may supply the log record assigned LSN=7 to the page store replica Q.

As depicted at reference numeral 260, in accordance with example implementations, the DBMS may periodically communicate requests to the page store replicas 220, inquiring as to the maximum LSN for the page store replica 220, i.e., the maximum LSN for which the page store replica 220 has all of the data. The page store replica 220 make this determination based on the inventory provided by the local records stored on the page store replica 220. For example, if a particular page store replica 220 stores log records for LSNs of 1 to 4 and 6 (and therefore, is missing log record 5), then the maximum LSN for this page store replica is 4. As described further herein, the DBMS uses the maximum LSN for such purposes as selecting a page store replica 220 for a read, determining which log records to remove from the common log (as depicted at reference numeral 231), identifying failure modes, performing recovery operations, and so forth.

Thus, to summarize, for writes, the DBMS assigns each log record describing a change to a page of the database a version number (such as an LSN) and stores the log record in the common log. The write engine 160 then writes the log records of the common log synchronously to any N log store replicas at storage nodes 110 in the cluster storage nodes to store the log records on each of the N log store replicas. When selecting these three log store replicas, if a particular storage node 110 that contains one of the log record replicas is not available, then another one is chosen and metadata is correspondingly updated. Due to the synchronous writes, the log records are durable, and correspondingly, the write request is acknowledged to client device from which the change to the page of the database was received. The write engine 160 also asynchronously writes the log records of the common log corresponding to a particular page (e.g., all log records of the common log that describe a change to the particular page) to N page store replicas 220 for the particular page. Moreover, this asynchronous writing of the log records to the page store replicas 220 for the page may occur in parallel with the synchronous writing of the log records to the log store replicas 212, in accordance with example implementations. After a predetermined number (one, for example) of the page store replicas 220 for the page acknowledges the asynchronous write, in accordance with example implementations, the write engine 160 may not try to retry any of the writes to the N page store replicas 220 for the particular page for purposes of avoiding overloading database resources. A gossip protocol may then be used between the N page store replicas 220 for the particular page for purposes of bringing all of the N page store replicas 220 for the particular page up to date.

In general, the gossip protocol may proceed as follows between two page store replicas 220. First, the storage nodes 110 that contain the two page store replicas 220 establish a connection with each other, and next, the two page store replicas enumerate and exchange information to ascertain which data items each page store replica 220 has and does not have. Each page store replica 220 may send to the page store replica 220 the log records that are missing. The gossip protocol may be based on peer-to-peer or broadcast communications, depending on the particular implementation. Thus, pursuant to the gossip protocol, after a given page store replica 220 receives a particular log record, this log record may propagate to one or multiple other page store replicas 220, without coordination from upper layers of the distributed database system 100.

For reads, it is noted that the page store replicas 220 may be inconsistent with each other at a given time, as one replica 220 may lag behind another. One way to solve this consistency problem is to use quorum reads. However, due to the use of the versioning through the LSNs, the quorum reads may not be used. Instead, in accordance with example implementations, the read engine 164 (FIG. 1) makes use of the LSNs to request a log record assigned a particular LSN or request a log record having the latest version (the version with the highest LSN). From the above-described write path, the read engine 164 has knowledge of the latest acknowledged version of a log record of any particular page.

In general, the read engine 164 may read a page from any of the page store replicas 220 for the page. Therefore, if a particular page store replica 220 for the page is not available to serve the read, the read engine 164 may query another page store replica 220 for the page. Moreover, if a particular page store replica 220 for the page has not received all log records corresponding to the page up to the requested LSN, the read engine 164 may query another page store replica 220 for the page. However, if the page store replica 220 for the page that is targeted by a read has received all log records corresponding to the page up to the requested LSN, then this page store replica 220 for the page may be used to serve the read and return the requested page.

Figure 3:
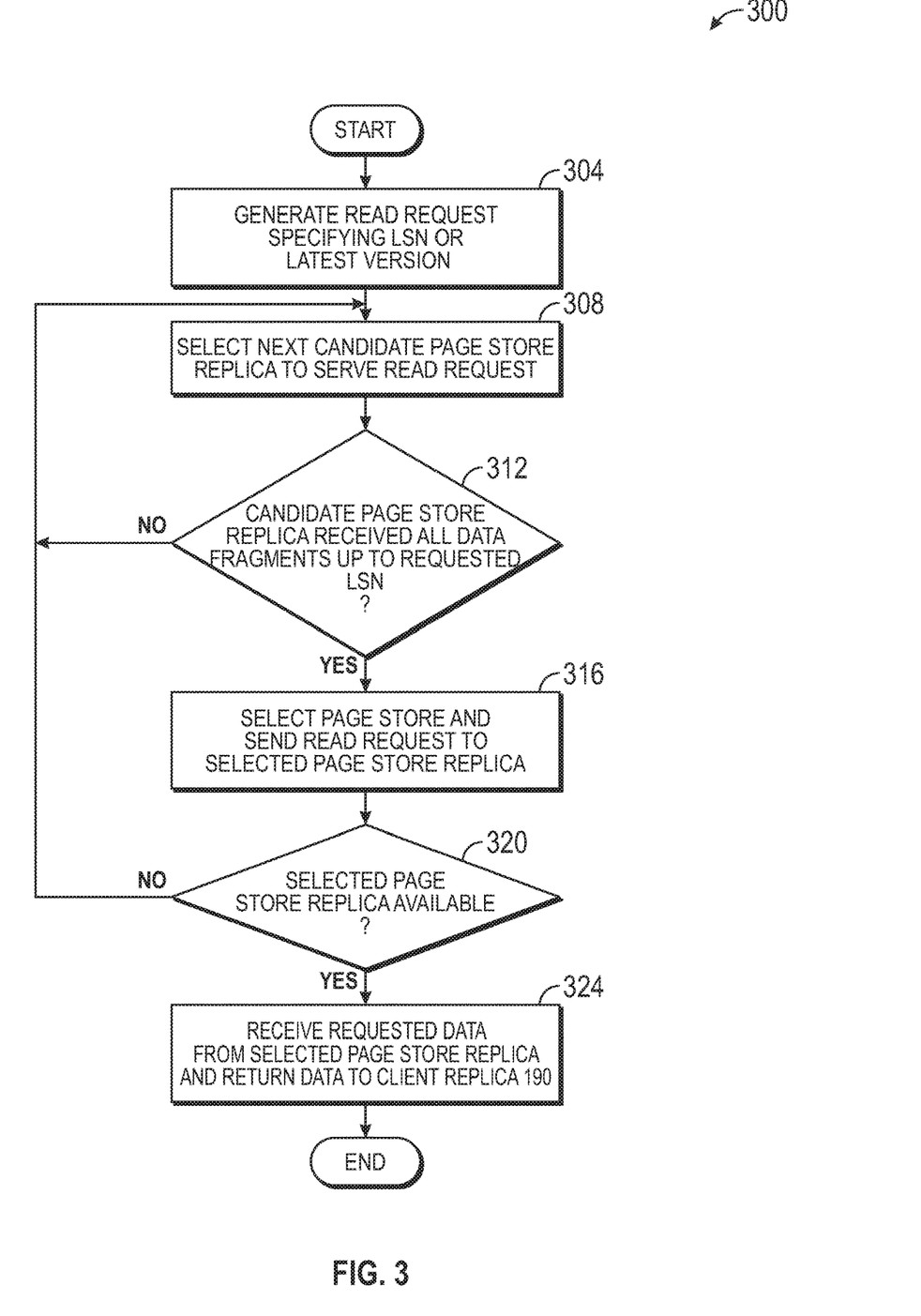
FIG. 3 is a flow diagram depicting the processing of a read request by the distributed database system according to an example implementation.

Thus, referring to FIG. 3 in conjunction with FIG. 1, in accordance with some implementations, the read engine 164 may perform operations to read pages from the database. A read request to read a page of the database may be generated (block 304) in response to, for example, user activity on the client 190. As depicted in FIG. 3, the read request may specify a particular LSN or may specify the latest version. The read engine 164 may select (block 308) the next candidate page store replica 220 for the page to serve the read request and determine (decision block 312) whether the candidate page store replica 220 for the page has received a log records corresponding to the page up to the requested LSN. It is noted that the determination in decision block 312 may be made based on knowledge of LSNs that have been acknowledged by the candidate page store replica 220 for the page as well as determined using a query to the candidate page store replica 220 for the page. If, at block 316, the candidate page store replica 220 for the page has received all log records corresponding to the page up to the requested LSN, then the read engine 164 selects the page store replica 220 for the page and send the read request to the selected page store replica 220 for the page. Otherwise, the read engine 164 selects another candidate page store replica 220 for the page, at block 308. If the selected page store replica 220 for the page is still available (decision block 320), then the page store replica 220 for the page serves the read requested (block 324). Otherwise, if in the interim, the selected page store replica 220 for the page has become unavailable (due to the storage node 110 that contains the selected page store replicas 220 becoming unavailable), then operations returns back to block 308 to select another candidate page store replica 220 for the page.

The number N of page store replicas for the page may be more than three or less than three, in accordance with further example implementations. For strict durability guarantees, three page store replicas for the page may be sufficient. The initial synchronous three way write of a log record of the common log guarantees that the log record is persisted in three page store replicas at three different storage nodes. The location of the log record is not important for durability. The log record remains in the common log remain until the log record is confirmed to be persisted to the three page store replicas for the page. Therefore, at any given point in time, at least three copies of the log record are in persistent storage and are available.

Regarding read and write availability for the systems and methods that are described herein, the probability of failure of each page store replica may be represented by "x." For the example implementation described herein in which three page store replicas for a page are used, a versioned log record corresponding to the page is stored in the common log and the versioned log record corresponding to the page is written to three different log store replicas 212 and to three page store replicas 220 for the page. The write is served when there are any three log store replicas 212 are available; and the probability of not being able to make the write is practically zero as it does not depend on availability of specific storage nodes that contain. In other words, the write may proceed as long as there are any three log store replicas 212 available. The reads may be served as long as one of the page store replicas 220 for the page is available. The probability of not being able to serve the read is $x^3$.

The methods and systems that are described herein further enhance the detection of page store replica failures and enhances the recovery of pages when such failures occur. More specifically, there may be, in general, three types of page store replica failures.

The first type of page store replica failure is a short term failure, such as a failure in which a page store replica 220 for a page is unavailable for less than a predetermined time (unavailable for a duration less than fifteen minutes, for example). For such a short term failure, the page store replica 220 for the page may be missing some log records that are present in the common log. However, the page store replica 220 for the page may recover these missing log records using the gossip protocol, in that one or multiple other page store replicas 220 for the page may supply the missing log records.

Another type of failure is a long term failure, such that a page store replica 220 is destroyed or is unavailable for a relatively long period of time (a period of time exceeding fifteen minutes, for example). The recovery engine 168 (FIG. 1) may detect this type of failure by monitoring how long a particular page store replica 220 for the page is unavailable, and the recovery engine 168 may perform the recovery as follows. First, the recovery engine 168 may create a new page store replica 220 for the page to replace the failed page store replica 220 for the page. For example, the recovery engine 168 may create a new page store replica 220 on another storage node in a different availability zone 116 than any of the other availability zones 116 that are associated with the other page store replicas 220 for the page. In some embodiments, the recovery engine 168 may create the new page store replica 220 for the page by coping another existing page store replica 220 for the page to a storage node 110 in the different availability zone 116 to replace the failed page store replica 220 for the page.

Another type of failure is a failure due to cascading short and long term failures of multiple page store replicas 220 for a page. Due to these cascading failures, if a storage node that contains a page store replica 220 for a page is destroyed and the page store replica 220 for the page contains some log records corresponding to the page that are not available on any other page store replica 220 for the page, the recovery engine 168 restores the log records corresponding to the page by reading the log records corresponding to the page from the common log. In other words, as further described herein by way of example, the recovery engine 168 may restore the latest version of a page by reading the log records corresponding to the page from the common log and writing these log records to the appropriate page store replica 220 for the page.

Figure 4:
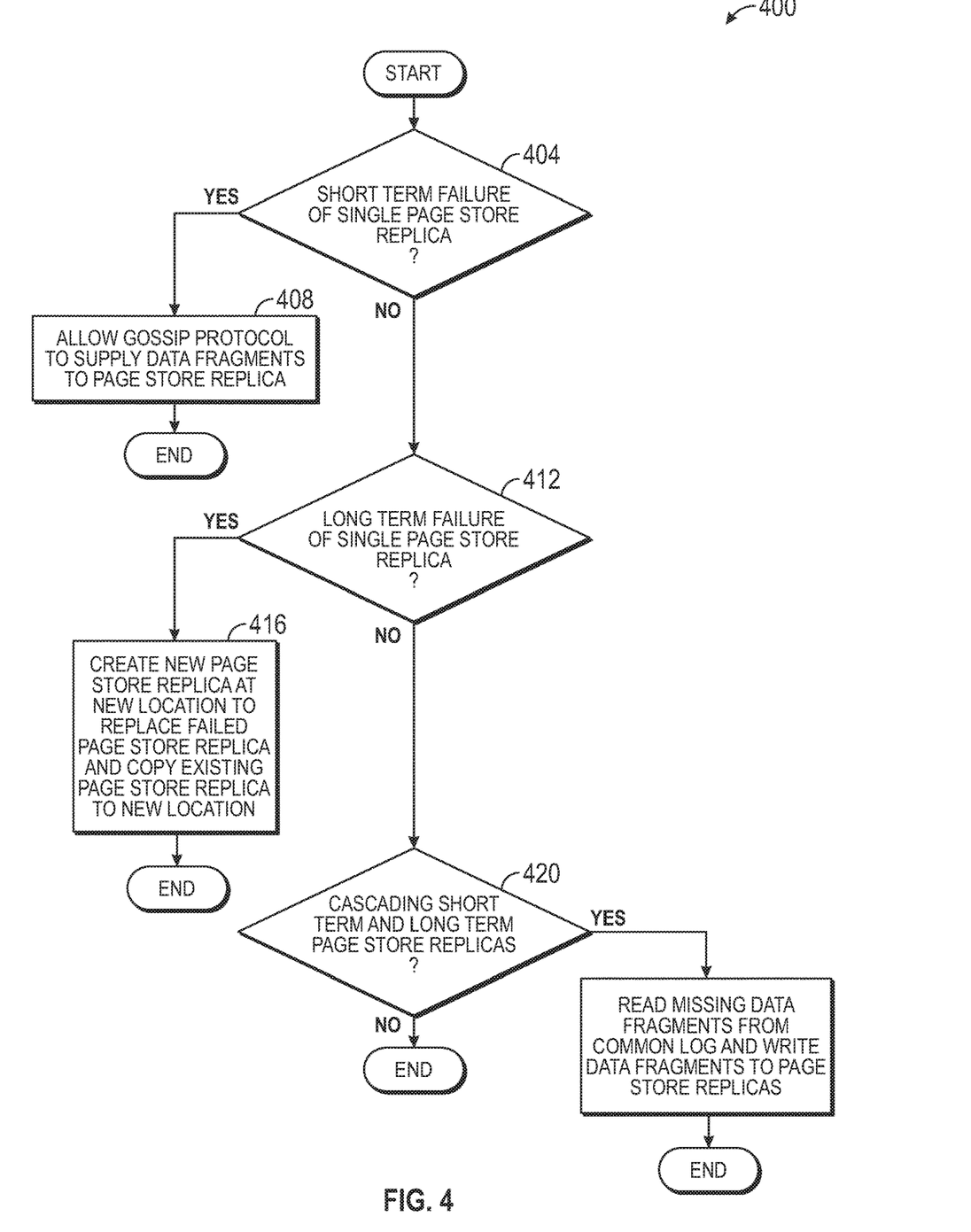
FIG. 4 is a flow diagram depicting a process used by the distributed database system to recover data due to a temporary or permanent failure of one or multiple page store replicas according to an example implementation.

Referring to FIG. 4 in conjunction with FIG. 1, in accordance with some implementations, the recovery engine 168 performs a method 400 for purposes of handling page store replica failures. Pursuant to the method 400, the recovery engine 168 determines (decision block 404) whether the inability of a particular page store replica 220 for a page to serve read request for a page and write requests is temporary. For example, due to this inability, the recovery engine 168 may determine, for example, whether the inability of the page store replica 220 for the page to serve reads request or acknowledge write requests has lasted more than a predetermined duration (a duration over 15 minutes, as an example). If under this threshold, then, in accordance with some implementations, the recovery engine 168 instructs one of the page store replicas 220 from which a failure was not detected to perform a gossip protocol to supply the missing log record(s) corresponding to the page to the newly created page store replicas.

If, however, the recovery engine 168 determines that the failure has exceeded the predetermined duration, then, pursuant to decision block 412, the recovery engine 168 may deem the failure of the page store replica 220 for the page to be a long term failure. If so, the recovery engine 168 may create (block 416) a new page store replica for the page to replace the failed page store replica 220 by copying an existing page store to another storage node in the cluster of storage nodes to produce a new page store replica 220 for the page at a new location.

As discussed above, another failure mode is due to cascading short and long term failures that include multiple page store replicas 220. If, pursuant to decision block 420, the recovery engine 168 determines this has occurred, then, the recovery engine 168, pursuant to block 424, reads the missing log record(s) corresponding to the page assigned to the page store from the common log and writes these log records(s) to the page store replicas 220 to recover the missing log records.

In accordance with some implementations, the recovery engine 168 detects cascading short and long term failures of multiple page store replicas 220 for the page by examining the maximum LSN inquiry responses from the page store replicas 220 for the page. If the recovery engine 168 determines that the maximum reported LSN across the page store replicas 220 of the same page store has decreased, then, in accordance with example implementations, this is a signal that the page store replica 220 for the page is assigned to had the latest log record(s) was destroyed; and accordingly, the recovery engine 168 performs the process outlined in block 424 to recover the latest log record(s).

Figure 5A:
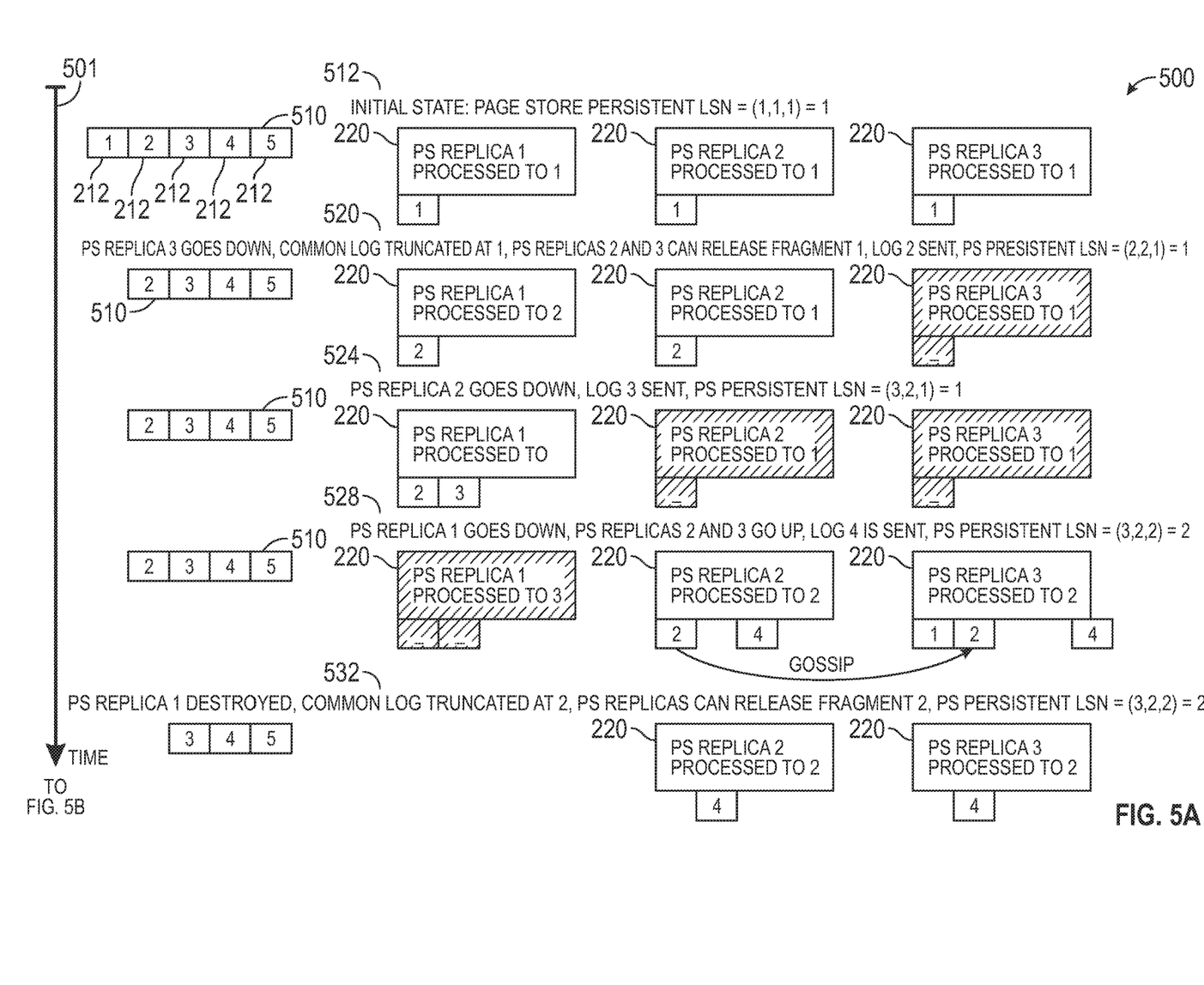
FIGS. 5A and 5B depict an example time line of cascading long term and short term page store replica failures and recovery from these failures according to an example implementation.
Figure 5B:
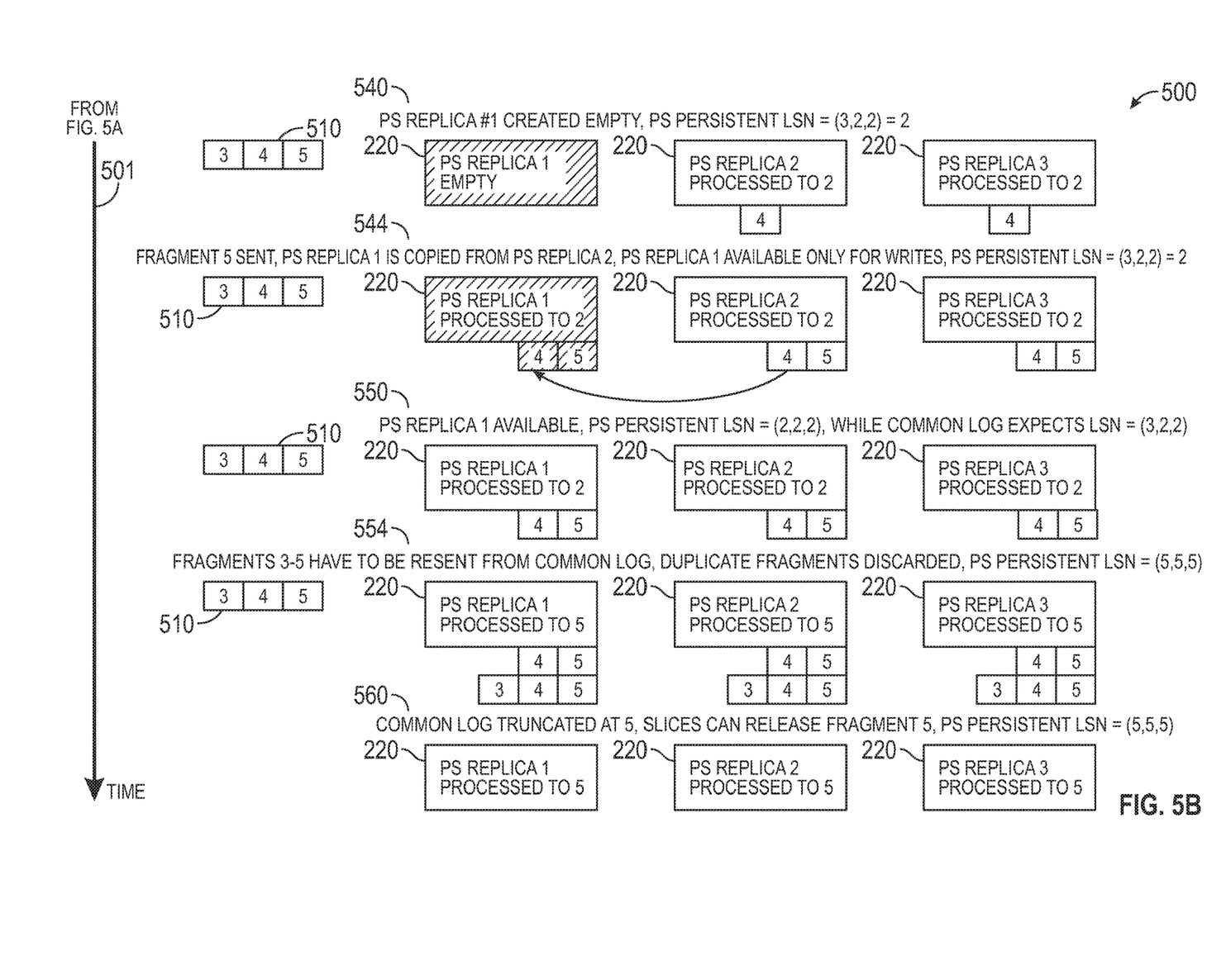

As a more specific example, FIGS. 5A and 5B depict an example time line of cascading long term and short term page store replica failures and recovery from these failures according to an example implementation. For this example, the DBMS of the distributed database system 100 maintains a common log 512 and the distributed database system 100 has three page store replicas 220 for the page (referred to specifically in connection with FIGS. 5A and 5B as page store replica 1, page store replica 2 and page store replica 3). Moreover, the example depicted in FIGS. 5A and 5B depicts progression of different states 512, 520, 524, 528, 532, 540, 544, 550, 554 and 560, at different times along a time line 501. For these states, the write engine 160 determines a "page store persistent LSN," which refers to the minimum of the maximum LSNs reported by the page store replicas 220.

In example state 512, the page store persistent LSN is "1" as the maximum LSN reported by each page store replica is "1." Moreover, for the state 512, all three page store replicas 1, 2 and 3 are available. It is noted that for state 512, the common log 510 has log records corresponding to log records 1, 2, 3, 4 and 5.

For the next example state 520, page store replica 3 has temporarily failed. Moreover, for state 520, the write engine 160 has truncated the common log 510 to remove the log record 1, as all three page store replicas 220 have acknowledged the write of log record 1. Moreover, as depicted in FIG. 5A, for the state 520, the page store replica 1 and the page store replica 2 each acknowledge a maximum LSN of "2." It is noted that at this state 520, due to its failure, the page store replica 3 does not acknowledge a maximum LSN. However, the write engine 160 proceeds with the previously-acknowledged maximum LSN for the page store replica 3 of "1." Thus, the page store persistent LSN for the example at state 520 is "1."

For the next example state 524, the page store replica 3 is still down, and now, page store replica 2 has failed. Moreover, at this state, the write engine 160 has not further truncated the common log 520, and thus as for state 520, the page store persistent LSN remained at 1. Moreover, as depicted for state 524, the page store replica 1 has acknowledged the write of log record records 2 and 3. Moreover, the page store replica 1 acknowledges the maximum LSN of "3," and with this information, the write engine 160 updates the page store persistent LSN. However, at this point, page store replicas 2 and 3 have not responded, the write engine 160 uses the previously-responded maximum LSNs from the page stores 2 and 3, and therefore, the write engine 160 maintains the page store persistent LSN at "1." As such, due to the page store persistent LSN not changing, the common log 510 remains the same.

At state 528, page store replicas 2 and 3 once again become available; and page store replica 1 has now become unavailable. Moreover, for state 528, the page store replica 2 reports a maximum LSN of "2." Although the page store replica 2 has received a log record 4, the maximum LSN for the page store replica 2 is still "2," as the page store replica 2 has not received a log record 3. Moreover, page store replica 3 has received log records 2 and 4 respectively, and reports a maximum LSN of "2," as the page store replica 3 has not received log record 3. In state 528, FIG. 5A also depicts the gossip protocol being used to transfer a replica of log record 2 from page store replica 2 to page store replica 3. The write engine 160 maintains the maximum LSN for page store replica 1 at "3," i.e., the previous value provided by the page store replica 1. Due to the page store persistent LSN increasing to "2," the write engine 160 may then further truncate the common log 510 so that the log record 2 is removed, leaving the log records 3, 4 and 5, as depicted at state 532.

At state 532, the page store replica 1 remains unavailable; the page stores may release log record 2; and the page store replicas 2 and 3 each reports their respective maximum LSN as being "2." Due to the page store persistent LSN remaining at "2," the write engine 160 does not further truncate the common log 510 so that log record 2 is removed from the common log 510.

Referring to FIG. 5B, at the next example state 540, the recovery engine 168 has detected a long term failure of page store replica 1. In other words, page store replica 1 has remained unavailable longer than a predetermined duration. Therefore, at state 540, the recovery engine 168 creates an empty page store replica 1 (at another storage node 110) as a replacement. For example, in accordance with some implementations, the recovery engine 168 may create an empty page store replica 1 at a storage node 110 that is part of an availability zone 116 different from the availability zones associated with page store replicas 2 and 3. At state 540, FIG. 5B illustrates that page store replicas 2 and 3 have still not processed log record 3; and as such, page store replicas 2 and 3 each report a maximum LSN of "2." Therefore, the page store persistent LSN remains at "2."

At subsequent state 544, the rebuilding of the log records for page store replica 1 is illustrated in that through the gossip protocol, log record 4 is communicated from page store replica 2 to page store replica 1. Moreover, a replica of log record 5 may have been communicated in a similar manner from page store replica 2 or 3. The page store persistent LSN remains at "2," as neither page store replica 1, 2 or 3 have received a replica of log record of record 3.

At state 550, the recovery engine 168, using the reported maximum LSNs and the previous page store persistent LSN, detects cascading failures of multiple page store replicas. In this manner, the page store replica 1 is now available but only reports a maximum LSN of "2." However, this represents a decrease in the maximum LSNs. In other words, the common log expects maximum LSNs of (3, 2, 2), whereas the page store replicas provide maximum LSNs of (2,2,2). As such, in accordance with example implementations, this signals the recovery engine 168 that multiple cascading failures of the page store replicas have occurred. As such, in accordance with example implementations, the recovery engine 168 initiates recovery from this mode of failure.

More specifically, at state 554, the recovery engine 168 resends the writes requests to write log records 3, 4 and 5 from the common log 510 to all three page store replicas 1, 2 and 3. Due to the writing of log records 3, 4 and 5 to the page store replicas 1, 2 and 3, respectively, all three page store replicas 1, 2 and 3 now report a maximum persistent LSN of "5." Accordingly, the write engine 160 may then truncate the common log to remove log record 5 from the common log, as depicted in state 560. Thus, at state 560, the page store replicas 1, 2 and 3 have each processed log records up to log records 5. Moreover, each page store replica 1, 2 and 3 reports a maximum LSN of "5," thereby leading to a page store persistent LSN of "5."

Thus, replication and storage policies for a distributed database system are described herein, which achieve higher write availabilities using relatively fewer page store replicas. Among the potential advantages, there may be practically one hundred percent availability for write requests. Moreover, the availability for read requests may be comparable with existing technologies using the same number of page store replicas. The storage and replication policies that are described herein may be used with multiple types of database systems and may be used with both monolithic and sharded databases.

Although the method of the present invention is described with respect to a DBMS 172 running on a database manager 150, in an alternate embodiment, the method of the present invention may be performed by a DBMS of a database service provided in a PaaS layer of a cloud computing environment provided by a cloud service provider.

While the present disclosure has been described with respect to a limited number of implementations, those skilled in the art, having the benefit of this disclosure, will appreciate numerous modifications and variations therefrom. It is intended that the appended claims cover all such modifications and variations.

What is claimed is:

1. A method comprising:
receiving an indication of a change to a page of a database;
adding a new log record corresponding to the page to a common log comprising log records, the new log record describing the change made to the page and assigned a distinct version number;
synchronously writing the new log record to each log store replica in a set of log store replicas;
asynchronously writing the new log record to all page store replicas for the page to update the page that is stored on each of the page store replicas, wherein the page store replica for the page serve reads for the page; and
in response to receiving, from a predetermined number of the page store replicas, an acknowledgement of the writing of the log record, discarding the new log record from the common log.

2. The method of claim 1, wherein the log store replicas and the page store replicas are at different storage nodes and the storage nodes are at different availability zones.

3. The method of claim 1, wherein the number of log store replicas in the set of log store replicas is the same as the number of page store replicas.

4. The method of claim 1, wherein the number of log store replicas in the set of log store replicas is the different than the number of page store replicas.

5. The method of claim 4, wherein the availability zones are associated with different geographical locations.

6. The method of claim 1, wherein the set of log store replicas comprises at least three log store replicas at different availability zones.

7. The method of claim 1, wherein asynchronously writing the new log record to all the page store replicas for the page comprises sending a write request to a first page store replica of the page store replicas, receiving an acknowledgement acknowledging the write request, and sending an instruction to the first page store replica to allow a peer-to-peer gossip protocol to be used between the first page store replica and a second page store replica to copy the new log record to the second page store replica.

8. The method of claim 1, further comprising:
reading the page, wherein the reading comprises selecting a page store replica of the page store replicas and reading the page from the selected page store replica.

9. The method of claim 8, wherein selecting the page store replicas comprises determining a requested logical sequence number associated with the reading of the page and selecting the page store replica based on a logical sequence number acknowledged by the selected page store replica.

10. The method of claim 1, further comprising:
detecting a failure of a page store replica for the page of the page store replicas; and
performing a recovery operation in response to detecting the failure, wherein performing the recovery operation comprises:
creating a new page store replica for the page to replace the failed page store replica.

11. The method of claim 10, wherein creating the new page store replica for the page comprises enabling the new page store replica for the page and at least one other page store replicas to use a peer-to-peer replication protocol to copy pages from the at least one other page store replica for the page to the new page store replica for the page.

12. The method of claim 1, further comprising:
detecting a cascading failure of multiple page store replicas of the page store replicas; and
performing a recovery operation in response to the detected cascading failure, wherein performing the recovery operation comprises:
identifying a set of log records in the common log corresponding to the page subject to the cascading failure;
reading the set of identified log records from the common log; and
writing the set of identified log records to the multiple page store replicas.

13. The method of claim 12, wherein detecting the cascading failure comprises determining:
determining a given page store replica of the page store replicas previously acknowledged the writing of a log record corresponding to the page; and
determining none of the other page store replicas are currently acknowledge writing of the new log record corresponding to the page.

14. The method of claim 1, further comprising:
detecting a failure of a log store replica in the set of log store replicas;
selecting a new set of log store replicas; and
synchronously writing the new log record to each log store replica in a set of log store replicas.

15. The method of claim 1, further comprising:
determining the number of log store replicas in the set of log store replicas based on a first replication policy for log stores; and
determining the number of the all page store replicas for the page based on a second replication policy for page stores, wherein the second replication policy is different from the second replication policy.

16. A non-transitory machine readable storage medium to store instructions that, when executed by a machine, cause the machine to:
receive an indication of a change to a page of a database;
adding a new log record corresponding to the page to a common log comprising log records, the new log record describing the change made to the page and assigned a distinct version number;
synchronously write the new log record to each log store replica in a set of log store replicas;
asynchronously write the new log record to all page store replicas for the page to update the page that is stored on each of the page store replicas, wherein the page store replicas for the page serve reads for the page; and
in response to receipt, from a predetermined number of page store replicas of the page store replicas, an acknowledgement of the writing of the log record, discarding the new log record from the common log.

17. An apparatus comprising:
a processor; and
a memory to store instructions that, when executed by the processor, cause the processor to:
receive an indication of a change to a page of a database;
adding a new log record corresponding to the page to a common log comprising log records, the new log record describing the change made to the page and assigned a distinct version number;
synchronously write the new log record to each log store replica in a set of log store replicas;
asynchronously write the new log record to all page store replicas for the page to update the page that is stored on each of the page store replicas, wherein the page store replicas for the page serve reads for the page; and
in response to receipt, from a predetermined number of page store replicas of the page store replicas, an acknowledgement of the writing of the log record, discarding the new log record from the common log.

18. The apparatus of claim 17, wherein the instructions, when executed by the processor, cause the processor to:
detect a failure of a page store replica for the page of the page store replicas; and
perform a recovery operation in response to detecting the failure, wherein performing the recovery operation comprises:
create a new page store replica for the page to replace the failed page store replica.

19. The apparatus of claim 18, wherein the instructions, when executed by the processor, cause the processor to:
create the new page store replica for the page by enabling the new page store replica for the page and at least one other page store replica to use a peer-to-peer replication protocol to copy log records from the at least one other page store replica for the page to the new page store replica for the page.

20. The apparatus of claim 17, wherein the instructions, when executed by the processor, cause the processor to:
detect cascading failure of multiple page store replicas of the page store replicas; and
perform a recovery operation in response to the detected cascading failure, wherein performing the recovery operation comprises:
identifying a set of log records in the common log corresponding to the page subject to the cascading failure;
reading the set of identified log records from the common log; and writing the set of identified log records to the multiple page store replicas.

* * * * *